(12) United States Patent
Henry

(10) Patent No.: US 6,282,830 B1
(45) Date of Patent: *Sep. 4, 2001

(54) VARIABLE FISHING LINE ACTION DEVICE AND METHOD

(75) Inventor: Michael W. Henry, Cabot, AR (US)

(73) Assignee: LineDancer, Inc., Cabot, AR (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/241,743

(22) Filed: Feb. 1, 1999

Related U.S. Application Data

(63) Continuation of application No. 29/072,928, filed on Jun. 25, 1997, now Pat. No. Des. 405,153.

(51) Int. Cl.[7] ............................................. A01K 69/00
(52) U.S. Cl. ................................. 43/4.5; 43/19.2; 43/24; 43/25
(58) Field of Search ............................... 43/4.5, 19.2, 24, 43/25, 18.1; D22/143

(56) References Cited

U.S. PATENT DOCUMENTS

| | | | |
|---|---|---|---|
| 2,319,462 | * | 5/1943 | Kruse . |
| 2,349,077 | * | 5/1944 | Comparelli . |
| 2,561,675 | * | 7/1951 | Ross . |
| 2,596,835 | * | 5/1952 | Benge . |
| 2,880,546 | * | 4/1959 | Pemberton . |
| 3,309,810 | * | 3/1967 | Hannon . |
| 3,789,534 | * | 2/1974 | Yankaitis ............................ 43/19.2 |
| 3,846,930 | * | 11/1974 | Brown ................................. 43/25 |
| 4,003,153 | * | 1/1977 | Khalil ................................. 43/25 |
| 5,035,074 | * | 7/1991 | Tylkowski . |

* cited by examiner

Primary Examiner—Charles T. Jordan
Assistant Examiner—Judith A. Nelson
(74) Attorney, Agent, or Firm—Jerry L. Mahurin

(57) ABSTRACT

A variable fishing line action device is an integral unit intended to be clipped on a fishing rod mounting an open-face spinning reel, preferably, between the reel and a first eye of the rod. It comprises a generally hook shaped line rest portion adapted to receive and divert a fishing line emanating from an open-face spinning reel toward the rod mounting the reel and, a C-shaped clip portion adapted to selectively and adjustably secure the line rest to the fishing rod in front of the reel. The device may be selectively disposed along the length of the rod, between the reel and the first eye to impart the desired action to a fishing line. In its preferred embodiment, the C-shaped clip is comprised of two diverging legs, and the device is formed from a single length of rigid stainless steel wire. Resilient pad insulators may be disposed on the legs to protect the rod from scratching by the clip. The method the device uses to impart action to a fishing line emanating from an open-face spinning reel is accomplished by diverting the line and then steadily reeling the line in. As this is done, the movement of the line in an arc as the spool of the open face reel rotates during reeling causes the line to jerk, imparting action to a lure secured thereto. Also disclosed is a rod mounting a device to practice the disclosed method.

17 Claims, 5 Drawing Sheets

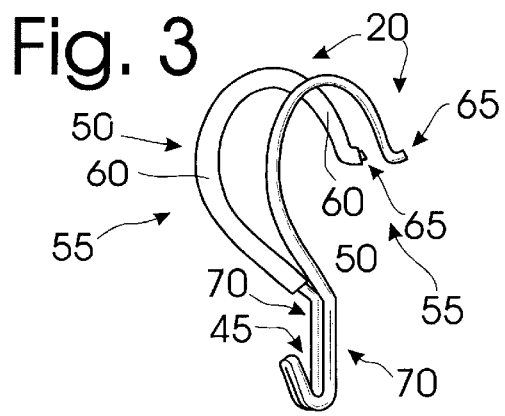
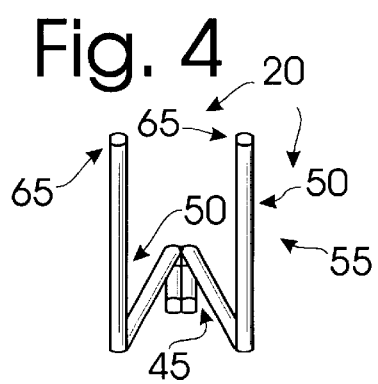
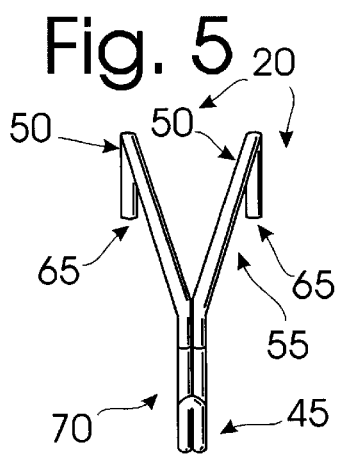
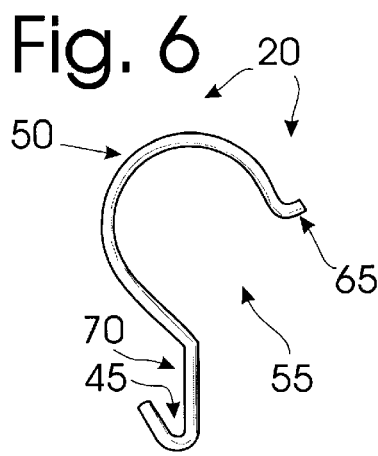
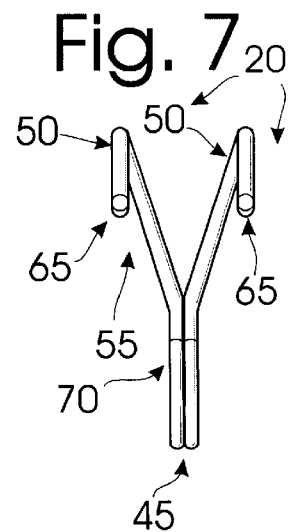
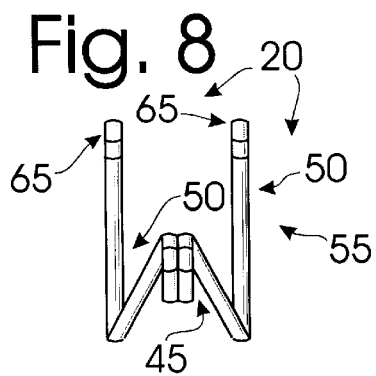

VARIABLE FISHING LINE ACTION DEVICE AND METHOD

CROSS REFERENCE TO RELATED PATENT APPLICATION

This is a Continuation-In-Part of U.S. patent application Ser. No. 29/072,928, filed Jun. 25, 1997, entitled: Fishing Line Action Deflector for a Spinning Reel (as amended). "which issued on Feb. 2, 1999 as U.S. Pat. No. D405,153."

BACKGROUND OF THE INVENTION

The present invention broadly relates to fishing, fishing rods and reels. Specifically, the present invention is a Variable Fishing Line Action Device and Method which is particularly well suited for use with a fishing rod mounting an open-face spinning reel. Art pertinent to the subject matter of the present invention can be found in various Subclasses of United States Patent Class 43.

Innumerable patents have issued on fishing rod related devices Prowant, U.S. Pat. No. 4,776,527; Simmons, U.S. Pat. No. 4,746,253; and Hannon, U.S. Pat. No. 3,309,810; all disclose fishing rod related devices intended to be disposed on the rod near a reel. Hannon is a device intended to aid in casting with an open face reel; Simmons is a strike indicator; and Prowant is a clamp-on fishing line dispenser.

Patents on fishing line action devices are generally for relatively complicated mechanical systems or arrangements to impart action to a fishing line or to the rod itself. For example Caldwell, U.S. Pat. No. 5,588,243, discloses a fishing line action device which employs the motion of an oar. The Fishing Jigging Device of Lindell, U.S. Pat. No. 4,680,885 uses a stepping motor to impart a rapid jigging action to a fishing line. Lindaberry, U.S. Pat. No. 4,821,448 discloses a rod mounted motor driven device to impart action to a fishing line.

Many patents have been issued on hooks used for various purposes including: Chen, U.S. Pat. No. 5,730,413; Burns, U.S. Pat. No. 1,863,743; Speir, U.S. Pat. No. 672,540; Merrill, U.S. Pat. No. 194,707; and Alker, U.S. Pat. No. Des. 31,995. However, the prior art fails to disclose a device intended to divert a fishing line emanating from an open face reel to impart action to the fishing line. Therefore, it is desirable to provide a device which would allow one to impart action to a fishing line with the use of complicated, clumsy arrangements or motor driven devices.

SUMMARY OF THE INVENTION

My variable fishing line action device deflects a fishing line emanating from an open-face spinning reel to impart a user adjustable action to the fishing line as it is reeled in without the need for fishing rod tip movement. My device enables an angler to increase lure vibration, or change existing action automatically. This allows one to change lure presentation without changing the lure. As a result my fishing line action device effectively doubles a fisherman's existing arsenal of lures.

My device is well suited for use with nearly every artificial bait that requires a constant retrieve including: spinner baits including large, small and in-line; top waters including buzzbaits, frogs and worms; all types of spoons; stick baits both large and small; all types of jigs; and all types of crank baits.

The device is suitable for use while fishing for many species of fish including Bass, Crappie, Bluegill, Walleye, Pike and Trout. The device is preferably made from nickel-plated stainless steel, making it Salt-Water safe as well. In short, my device enables an angler to impart action, vibration, and/or technique into his or her style of fishing regardless of species of fish or level of angler.

In its preferred embodiment, my variable fishing line action device is an integral unit intended to be clipped on a fishing rod mounting an open-face spinning reel, preferably, between the reel and a first eye of the rod. It comprises a generally hook shaped line rest portion adapted to receive and divert a fishing line emanating from an open-face spinning reel toward the rod mounting the reel and maintains the line roughly parallel to the rod. A C-shaped clip portion selectively and adjustably secures the line rest to the fishing rod. The device may be slid along the length of the rod, between the reel and the first eye to impart the desired action to a fishing line.

Preferably, the C-shaped clip is comprised of two diverging legs and, resilient pad insulators are disposed on the legs to protect the rod from scratching by the clip. The preferred illustrated embodiment is formed from a single length of rigid stainless steel wire bent to form a double-diameter width line rest hook and the two C-shaped clip legs extending therefrom.

The device is installed by simply attaching it to a rod at the smallest diameter, directly behind the first eye, closest to the reel. Then the device is slid towards the reel. It should start to fly grip the rod approximately halfway between the first eye and the reel, or approximately ten inches in front of the reel. It is important that the device be positioned on the pole so that the line-rest opening is facing to the right side as one holds the rod due to the direction of rotation of conventional spinning reels. Then one casts as normal, then passes the line over the line rest, and then steadily cranks the line in.

The device is fully adjustable. For the highest degree of action, desirable for top water baits and jigs, the device is positioned onto the pole directly in front of the reel. For less action, as suitable for spinner baits, spoons and buzz baits, the device is slid or clipped further down the pole away from the reel.

A rod permanently mounting my variable fishing line action device can employ an adjustable mounting arrangement incorporated or closely associated with the rod. As a result, a simplified line rest hook arrangement can be used to engage the rods mounting arrangement.

The method the device uses to impart action to a fishing line emanating from an open-face spinning reel is comprised of the steps of diverting the line to a position adjacent to, and generally parallel to the rod mounting the reel; and then steadily reeling the line in. With the line diverted from its normal position, the movement of the line in an arc as the spool of the open face reel rotates during reeling causes the line to jerk, imparting action to a lure secured to the end of the line.

Therefore, a primary object of the present invention is to provide a variable fishing line action device and method.

More specifically an object of the present invention is to provide a device and method which will impart action to a fishing line emanating from the face of an open face spinning reel.

A related object of the present invention is to provide a device to deflect the line emanating from an open face spinning reel to impart action to the line.

A related object of the present invention is to provide a method of deflecting the line emanating from an open face spinning reel whereas a steady cranking of the reel will impart action to the line.

An object of the present invention is to provide a fishing line action device for which the degree of action that is imparted to the line is readily adjustable.

An object of the present invention is to provide a variable fishing line action device which will not corrode due to exposure to moisture or saltwater.

An object of the present invention is to provide a variable fishing line action device which will not degrade performance of a fishing rod.

A related object of the present invention is to provide a variable fishing line action device which will not damage a fishing rod upon which it is used.

Another related object of the present invention is to provide a variable fishing line action device which will allow one to operate the rod an reel mounting the device normally, without using or removing the device.

Yet another related object of the present invention is to provide a variable fishing line action device which can be readily removed when its use is not desired.

An object of the present invention is to provide a variable fishing line action device which will not degrade the quality or integrity of a fishing line used therewith.

Likewise, an object of the present invention is to provide a variable fishing line action device which will not be worn by extensive use.

An object of the present invention is to provide a variable fishing line action device and method which can be used with a variety of spin cast lures.

An object of the present invention is to provide a variable fishing line action device and method which can be used anglers of various expertise.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views:

FIG. 3 is an isometric view of my device showing a sleeve installed on one leg of the clip for illustrative purposes;

FIG. 4 is a top plan view of my device;

FIG. 5 is a front elevational view of my device;

FIG. 6 is a side elevational view of my device;

FIG. 7 is a rear elevational view of my device;

FIG. 8 is a bottom plan view of my device.

DETAILED DESCRIPTION

Figure 1:
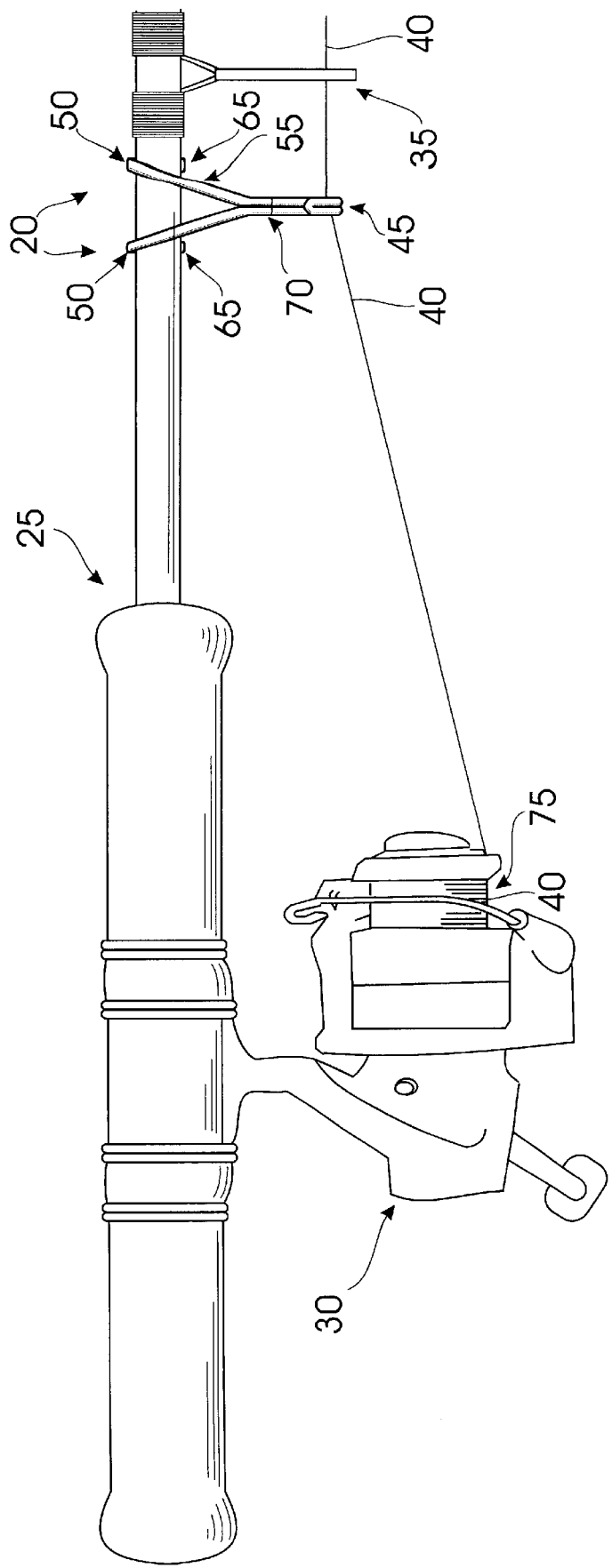
FIG. 1 is an environmental view of my Fishing Line Action Device disposed on a spinning rod in a moderate action position.

With reference now to the accompanying drawings, the preferred embodiment of my Variable Fishing Line action device 20 is broadly designated by the reference numeral 20.

In the preferred, illustrated embodiment my variable fishing line action device 20 is an integral unit formed from a single length of jig bent stainless steel. It is intended to be clipped on a fishing rod 25 mounting an open-face spinning reel 30. As detailed below and illustrated in FIGS. 1 and 2 it is preferably mounted between the reel 30 and a first eye 35 of the rod, closest to the reel 30. However it can be slid along the length of the rod 25 to vary the action imparted to the fishing line 40 and hence a lure.

My fishing line action device 20 is comprised of an integral, generally hook shaped line rest portion 45 and two diverging C-shaped clip legs 50 extending from the line rest 45 to form a C-shaped clip portion 55. The line rest 45 selectively receives and diverts the line 40 emanating from the face of an open face reel 30 toward the rod 25. The rest also maintains the line 40 roughly parallel to the rod 25. The clip 55 selectively and adjustably secures the line rest 45 to the fishing rod 25.

Resilient pad insulators or sleeves 60 are preferably disposed over the clip legs 50 to protect the rod 25 from scratching. See FIG. 3. To further protect the rod's finish and integrity, the ends 65 of the legs 50 are bent up so that the relatively sharp or burred ends of the legs 50 will not scratch the rod 25. Generally the preferred embodiment 20 is formed from a single length of relatively rigid stainless steel wire which will hold its bent shape with repeated use, repeated spreading of the clip legs 50, and repeated clipping and unclipping. The preferred illustrated embodiment 20 is bent to form a double-diameter width line rest hook 45. The two C-shaped clip legs 50 extend from the line rest riser 70 and diverge away from each other and terminate in up-bent ends 65.

Figure 2:
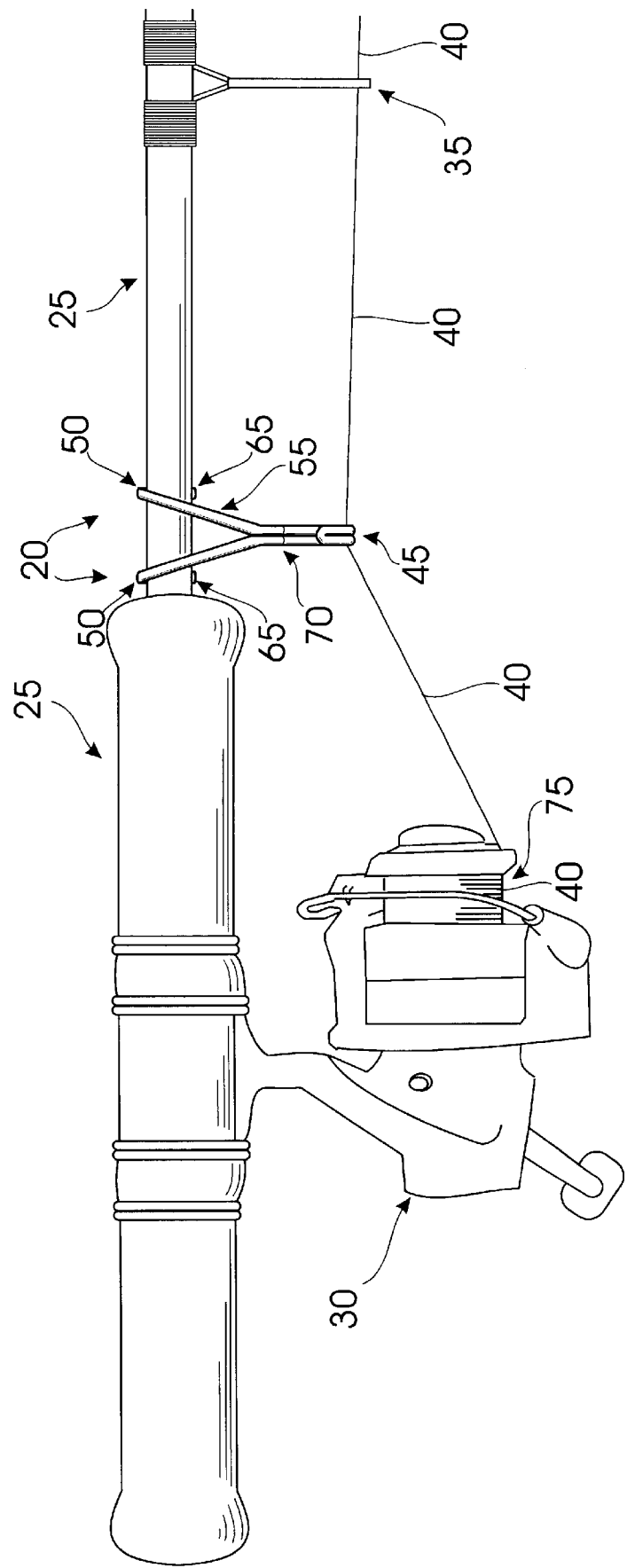
FIG. 2 is an environmental view of my device disposed on a spinning rod in a high action position.

With attention directed to FIGS. 1 and 2, to install the device 20 one clips it to a rod 25 directly behind the first eye 35, where it is generally the smallest diameter, between the fist eye 35 and the reel 30. The device 20 is slid towards the reel 30 and should start to firmly grip the rod 25 approximately halfway between the first eye 35 and the reel 30. A different diameter clip device 20 can be employed as best suited for a particular rod 25 and/or the rod's 25 primary use (i.e. type lure that is usually used with the rod 25). Generally speaking the device 20 should firmly grip the rod 25 approximately ten inches in front of the reel 30. Due to the direction of rotation of conventional spinning reels 30, in order to function properly, the preferred embodiment of the device 20 should be positioned with the line 40-rest opening facing to the right side as one holds the rod 25.

To use the fishing line action device 20 one casts as normal with the line 40 paying out as normal. The line 40 in front of the reel 30 is then passed over the line rest 45, into which the line 40 will settle. Then the line 40 is steadily cranked in. With the line 40 diverted from its normal position, the movement of the line 40 in an arc as the spool 75 of the open face reel 30 rotates during reeling causes the line 40 to jerk, imparting action to a lure secured to the end of the line 40.

The device 20 is fully adjustable. For the highest degree of action the device 20 is positioned onto the rod 25 directly in front of the reel 30 (FIG. 2). For less action the device 20 is slid or clipped further down the pole away from the reel 30, toward the first eye 35 (FIG. 1).

Figure 9:
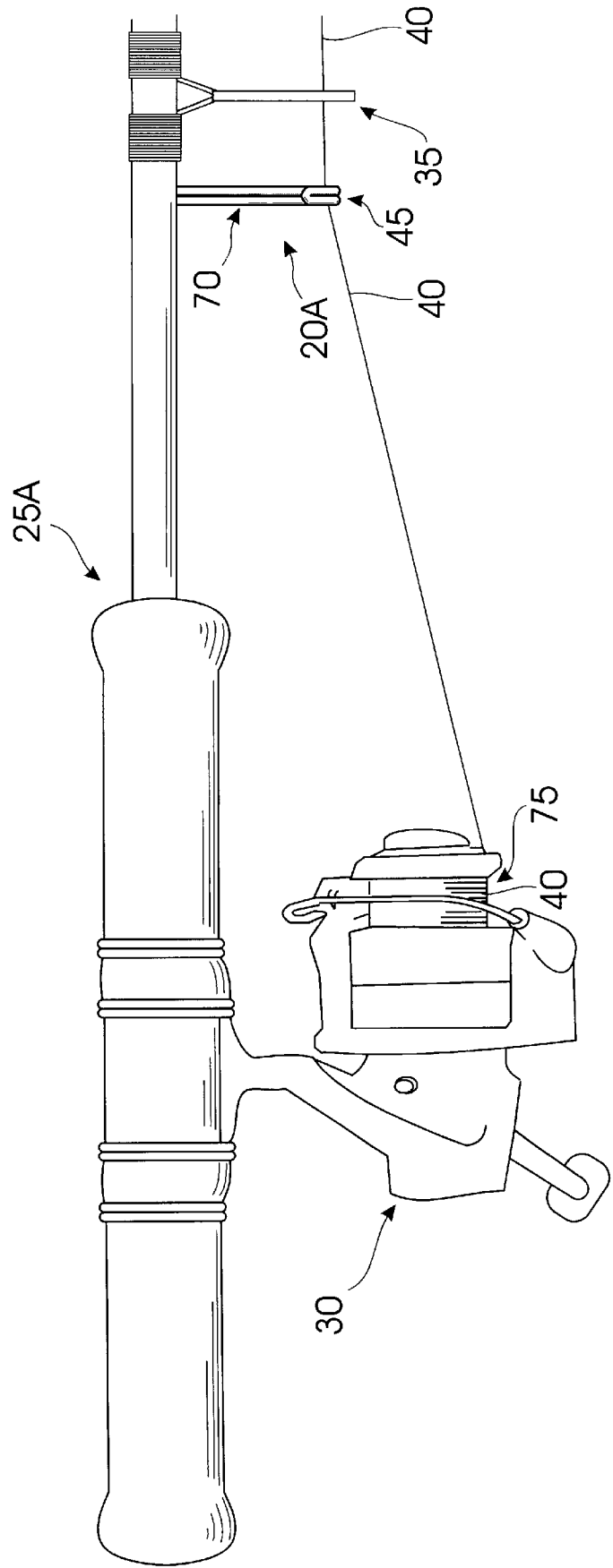
FIG. 9 is an environmental view of a fishing rod employing an integrated embodiment of my fishing line action device deployed in a moderate action position; and, FIG. 10 an environmental view of a fishing rod employing the integrated embodiment in a high action position.
Figure 10:
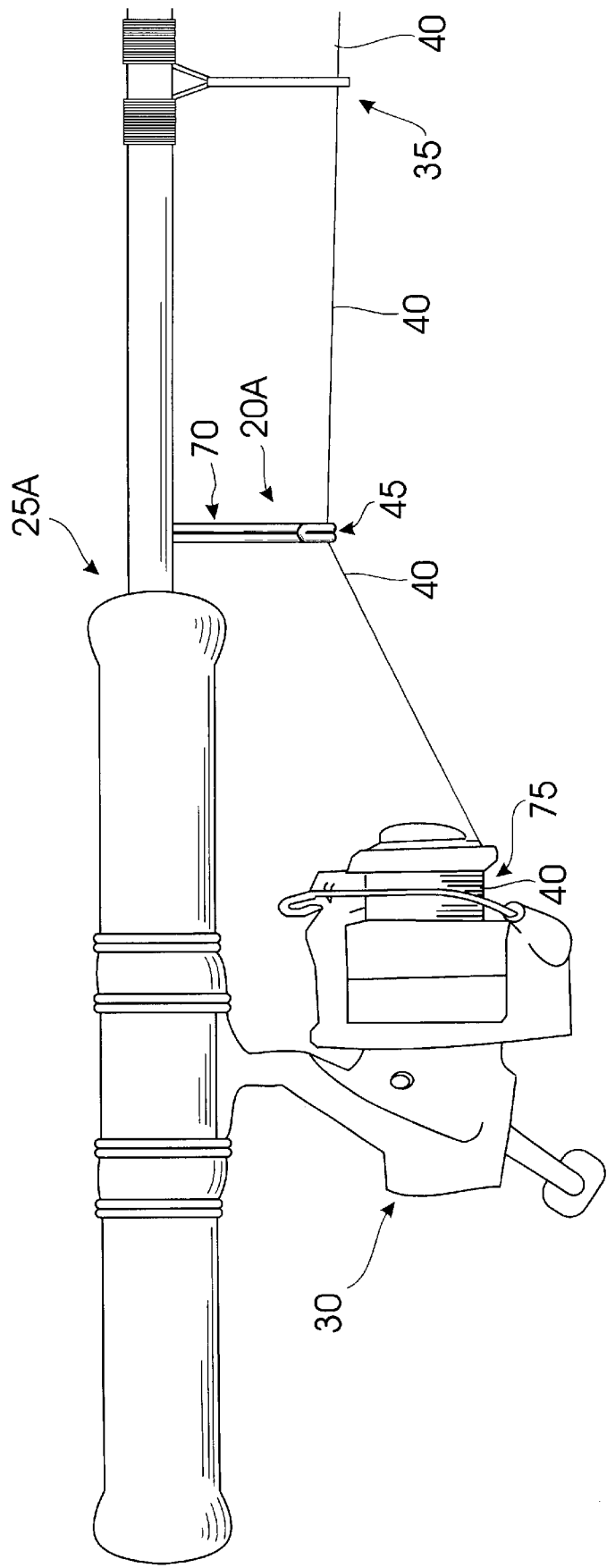

As generally illustrated in FIGS. 9 and 10, a rod 25A can permanently mount a variable fishing line action device 20A. Preferably a mounting arrangement incorporated into or closely associated with a rod 25A will be adjustable. A collet or similar clamping collar can be used to mount a modified line action device 20A having a line rest 45. Alternatively, a slot defined in the rod's 25A body could mount a modified line action device 20A primarily comprising a bulleted line rest 45 and riser 70, with an associated locking mechanism to hold it in place.

The method which the device 20 employs to impart action to a fishing line 40 emanating from an open-face spinning reel 30 is comprised of the following steps: The line 40 is diverted from its normal potion and angle to a position adjacent to, and generally parallel to the rod 25 mounting the reel 30. (See FIGS. 1 and 2.) Then the line 40 is steadily reeled in.

The line 40 being drawn into an open face reel 30 normally describes a cone, extending from the reel spool 75, at its base, to the first rod eye 35 or beyond, at its somewhat truncated apex. Therefore, when the line 40 is diverted to a point relatively close to the reel face, the line 40 jerks as it cannot smoothly describe the cone dictated by the diameter of the reel spool 75. The position to which the line 40 is diverted can be adjusted along the rod 25 to control the degree of action imparted to the line 40. As the point to which the line 40 is diverted is moved away from the reel face, the action imparted to the line 40 is minimized (FIGS. 1 and 9). Conversely, to maximize action the point to which the line 40 is diverted is moved closer to the rod 25 face (FIGS. 2 and 10).

From the foregoing, it will be seen that this invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense. For example, to mold or shape the present fishing line action device 20 from an abrasion resistive, resilient material or composite material is anticipated.

What is claimed is:

1. A fishing lure action device for a fishing line emanating from open-face spinning reels, said device comprising:
   a static fishing line deflection means for selectively imparting action to a fishing lure secured to a distal end of a fishing line emanating from an open-face spinning reel, said deflection means diverting said fishing line toward a rod mounting said reel to a point spaced apart from said reel, said point falling between a face of said reel and a first eye disposed on said rod, thereby disrupting a cone shaped path described by said line, causing said line to jerk, imparting action to said lure secured to said distal end of said line when said line is reeled in; and,
   fishing rod engagement means for selectively, snap-fittingly securing said deflection means to said fishing rod in front of said reel, between said face of said reel and said first eye of said rod, said engagement means allowing ready selective removal of said device from said rod.

2. The fishing line action device as defined in claim 1 wherein said engagement means is selectively adjustable along a length of said rod between said face of said open-face reel and said first eye of said rod.

3. The fishing line action device as defined in claim 2 wherein said deflection means comprises a static, generally hook shaped line rest.

4. The fishing line action device as defined in claim 3 wherein said engagement means comprises a C-shaped clip adapted to selectively engage and disengage said rod.

5. The fishing line action device as defined in claim 4 wherein said line rest and clip are an integral, static unit.

6. The fishing line action device as defined in claim 5 wherein said C-shaped clip is comprised of two diverging legs adapted to selectively snap fit onto and off of said rod.

7. The fishing line action device as defined in claim 6 wherein said device is formed from a single length of corrosion resistive rigid wire.

8. The fishing line action device as defined in claim 7 further comprising resilient insulation disposed on said legs to protect said rod from scratching by said clip.

9. A static, integral variable action fishing lure action device for open-face spinning reels comprising:
   a static, generally hook shaped line rest portion adapted to receive and divert a fishing line emanating from an open-face spinning reel toward a rod mounting said reel to a point between a face of said reel and a first eye of said rod, said point spaced apart from and adjacent to said rod, thereby disrupting a cone shaped path described by said line, causing said line to jerk, imparting action to a lure secured to a distal end of said line when said line is reeled in; and,
   a C-shaped clip portion adapted to selectively, adjustably and removably snap fit said line rest to said fishing rod in front of said reel, between said reel face and said first eye of said rod.

10. The fishing line action device as defined in claim 9 wherein said C-shaped clip is comprised of two diverging legs.

11. The fishing line action device as defined in claim 10 wherein said device is formed from a single length of rigid stainless steel wire.

12. The fishing line action device as defined in claim 11 further comprising resilient insulation disposed on said legs to protect said rod from marring by said clip.

13. A variable line and lure action fishing rod for mounting an open-face spinning reel, said rod comprising:
   a grip portion;
   a mounting portion disposed in front of said grip portion, said mounting portion adapted to receive and mount an open-face spinning reel;
   a tapered rod shaft extending from said mounting portion, said shaft terminating in a relatively small diameter tip;
   a set of eyes adapted to receive and guide a line emanating from a reel mounted by said mounting portion; and,
   static fishing line deflection means for selectively imparting action to a fishing lure secured to a distal end of a fishing line emanating from an open-face spinning reel mounted by said mounting portion, said deflection means diverting said fishing line toward said rod shaft to an adjustably fixed point spaced apart from said rod, between a face of said reel and a first eye of said rod to disrupt a cone shaped path described by said line, causing said line to jerk, imparting action to said lure secured to said distal end of said line when said line is reeled in.

14. The fishing rod as defined in claim 13 wherein said deflection means is selectively adjustable along a length of said rod between said mounting portion and said first eye.

15. The fishing line action device as defined in claim 14 wherein said deflection means comprises a generally hook shaped static line rest.

16. A method for imparting action to a fishing lure secured to a distal end of a fishing line emanating from an open-face spinning reel, wherein said line emanating from said reel describes a cone-shaped path, a base of said cone shaped path coinciding with said face of said reel and an apex of said cone generally coinciding with said first eye of said rod, said method comprising the steps of:

diverting a fishing line emanating from an open-face spinning reel to a static position adjacent to a fishing rod mounting said spinning reel between a face of said spinning reel and a first eye of said rod; and, steadily reeling said line in using said reel;

thereby disrupting said cone shaped path described by said line, causing said line to jerk, imparting action to said lure secured to said distal end of said line.

17. The method for imparting action to a fishing line as defined in claim 16 wherein said position in said diverting step is selectively adjustable between said reel face and said first eye of said rod to selectively adjust the action imparted to said lure.

* * * * *